(12) United States Patent
de Souza et al.

(10) Patent No.: US 7,773,096 B2
(45) Date of Patent: Aug. 10, 2010

(54) ALTERNATIVE GRAPHICS PIPE

(75) Inventors: Jeremy de Souza, Redmond, WA (US); Matthew B. Karr, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 299 days.

(21) Appl. No.: 11/299,535

(22) Filed: Dec. 12, 2005

(65) Prior Publication Data

US 2007/0132753 A1 Jun. 14, 2007

(51) Int. Cl.
*G09G 5/00* (2006.01)

(52) U.S. Cl. ...................................... 345/619
(58) Field of Classification Search .................. 345/619
See application file for complete search history.

(56) References Cited

U.S. PATENT DOCUMENTS

| | | | | |
|---|---|---|---|---|
| 5,580,251 | A  * | 12/1996 | Gilkes et al. ................ | 434/113 |
| 6,225,920 | B1 * | 5/2001  | Dayle ........................... | 341/21  |
| 6,509,911 | B1 * | 1/2003  | Shimotono ................... | 715/761 |
| 6,538,660 | B1 * | 3/2003  | Celi et al. .................... | 345/592 |
| 6,546,431 | B1   | 4/2003  | Brown et al.              |         |
| 6,590,583 | B2 * | 7/2003  | Soohoo ........................ | 345/660 |
| 6,784,905 | B2 * | 8/2004  | Brown et al. ................ | 715/865 |
| 6,802,055 | B2 * | 10/2004 | Jade et al. ................... | 717/130 |
| 6,829,746 | B1   | 12/2004 | Schwerdtfeger et al.     |         |
| 6,876,369 | B2 * | 4/2005  | Brown et al. ................ | 715/768 |
| 6,889,337 | B1   | 5/2005  | Yee                       |         |
| 6,931,151 | B2 * | 8/2005  | Weast ........................... | 382/162 |
| 6,982,682 | B1 * | 1/2006  | Kaulgud et al. ............. | 345/1.1 |
| 7,015,916 | B2 * | 3/2006  | Sasaki et al. ................ | 345/531 |
| 7,119,808 | B2 * | 10/2006 | Gonzalez et al. ............ | 345/502 |
| 7,119,809 | B1 * | 10/2006 | McCabe ...................... | 345/506 |
| 7,140,024 | B2 * | 11/2006 | Kaulgud et al. ............ | 719/310 |
| 7,168,049 | B2 * | 1/2007  | Day ............................. | 715/835 |
| 7,287,984 | B2 * | 10/2007 | Sweeney ..................... | 434/112 |
| 2001/0035862 | A1 * | 11/2001 | Nakamura et al. .......... | 345/204 |
| 2001/0050686 | A1 * | 12/2001 | Allen .......................... | 345/543 |

(Continued)

FOREIGN PATENT DOCUMENTS

GB          2342477          4/2000

(Continued)

OTHER PUBLICATIONS

Pixel-planes 5: a heterogeneous multiprocessor graphics system using processor-enhanced memories Henry Fuchs, John Poulton, John Eyles, Trey Greer, Jack Goldfeather, David Ellsworth, Steve Molnar, Greg Turk, Brice Tebbs, Laura Israel Jul. 1989 ACM SIGGRAPH Computer Graphics , Proceedings of the 16th annual conference on Computer graphics and in.*

(Continued)

*Primary Examiner*—Javid A Amini

(57) ABSTRACT

Various technologies and techniques are disclosed that improve the operation of accessibility applications. A graphics pipe is provided that can be called in user mode from multiple accessibility programs. A request is received from an accessibility application to access the graphics pipe, and a connection is established. The accessibility application listens to the graphics pipe for particular content of interest and builds a model based on that content. The model is used to deliver content to an end user appropriately. Screen captures can be performed on at least part of the content and then rendered onto another surface.

20 Claims, 7 Drawing Sheets

U.S. PATENT DOCUMENTS

| | | | |
|---|---|---|---|
| 2002/0085037 A1* | 7/2002 | Leavitt et al. | 345/765 |
| 2002/0091991 A1* | 7/2002 | Castro | 717/106 |
| 2002/0109725 A1* | 8/2002 | Suzuki et al. | 345/769 |
| 2002/0155419 A1 | 10/2002 | Banerjee et al. | |
| 2003/0001854 A1* | 1/2003 | Jade et al. | 345/581 |
| 2003/0117371 A1* | 6/2003 | Roberts et al. | 345/156 |
| 2003/0117441 A1 | 6/2003 | Walls et al. | |
| 2003/0128216 A1 | 7/2003 | Walls et al. | |
| 2003/0137547 A1* | 7/2003 | Brown et al. | 345/865 |
| 2003/0160795 A1* | 8/2003 | Alcorn et al. | 345/506 |
| 2003/0210266 A1* | 11/2003 | Cragun et al. | 345/762 |
| 2004/0015862 A1 | 1/2004 | Dunn | |
| 2004/0076312 A1* | 4/2004 | Sweeney | 382/114 |
| 2004/0104913 A1 | 6/2004 | Walls et al. | |
| 2004/0117370 A1* | 6/2004 | Dutta et al. | 707/9 |
| 2004/0139370 A1* | 7/2004 | Bailey et al. | 714/38 |
| 2004/0148568 A1* | 7/2004 | Springer | 715/513 |
| 2004/0175036 A1 | 9/2004 | Graham | |
| 2004/0218451 A1* | 11/2004 | Said et al. | 365/222 |
| 2005/0012749 A1 | 1/2005 | Gonzalez et al. | |
| 2005/0015255 A1 | 1/2005 | Kaye et al. | |
| 2005/0119622 A1* | 6/2005 | Temple | 604/189 |
| 2005/0166214 A1* | 7/2005 | Kaulgud et al. | 719/321 |
| 2005/0233287 A1* | 10/2005 | Bulatov et al. | 434/114 |
| 2005/0270302 A1* | 12/2005 | Weast | 345/590 |
| 2006/0290700 A1* | 12/2006 | Gonzalez et al. | 345/502 |
| 2007/0074167 A1* | 3/2007 | Cohrs et al. | 717/124 |
| 2007/0132753 A1* | 6/2007 | de Souza et al. | 345/418 |

FOREIGN PATENT DOCUMENTS

| | | |
|---|---|---|
| GB | 2352313 | 1/2001 |

OTHER PUBLICATIONS

Greg Humphreys, Matthew Eldridge, Ian Buck, Gordan Stoll, Matthew Everett, Pat Hanrahan WireGL: a scalable graphics system for clusters SIGGRAPH '01: Proceedings of the 28th annual conference on Computer graphics and interactive techniques Aug. 2001.*

Seongil Lee, Sang Hyuk Hong, Jae Wook JeonDesigning a univeDesigning a universal keyboard using chording gloves CUU '03: Proceedings of the 2003 conference on Universal usability, Nov. 2003.*

International Search Report dated Apr. 20, 2007 for Application No. PCT/US2006/044927, 11 pages.

Office Action from the Patent Office of the State Intellectual Property Office of the People's Republic of China for Application No. 200680046334.6 dated Nov. 6, 2009.

Herman et al., "SVG Linearization and Accessibility", Computer Graphics forum, vol. 21, No. 4, pp. 777-786, The Eurographics Association and Blackwell Publishers Ltd. 2002.

Blanchard, Harry E., "Standards: Standards for Multimedia, Accessibility, and the Information Infrastructure", SIGCHI Bulletin, vol. 29 No. 3, Jul. 1997.

Lorenz et al. "Semantic Access to Graphical Web Resources for Blind Users", 3rd International Semantic Web Conference 2004, available at http://iswc2004.semanticweb.org/posters/PID-YIHSOXCY-1090249595.pdf.

Extended European Search Report for International Application No. PCT/US2006044927 dated Dec. 9, 2008.

European Patent Office Communication regarding Application No. 06838086.4-2221 / 1960900 dated Mar. 3, 2009.

Chenede et al., "Excerpt from the source code of gnome-mag", pp. 1-24, Oct. 4, 2005, XP-002505336, available at http://ftp.gnome.org/pub/GNOME/sources/gnome-mag/0.12/gnome-mag-0.12.2.tar.gz>.

* cited by examiner

ALTERNATIVE GRAPHICS PIPE

BACKGROUND

Assistive technologies are software or hardware products that make software applications or operating systems accessible to individuals with a range of disabilities, such as impaired mobility, sight, hearing, etc. Examples of assistive technologies include magnifiers, screen readers, and Braille displays. These products use a variety of data interception techniques throughout the operating system in order to operate. Generally, assistive technologies intercept graphics primitive function calls at the display driver interface (DDI) level and use the operating system kernel state to build off-screen models. Such techniques often cause system instability and crashes.

SUMMARY

Various technologies and techniques are disclosed that improve the operation of accessibility applications. A graphics pipe is provided that can be called in user mode from multiple accessibility programs simultaneously and/or separately. A request is received from an accessibility application to access the graphics pipe, and a connection is established. The accessibility application listens to the graphics pipe for particular content of interest and builds a model based on that content. The model is used to deliver content in an accessibility application to an end user appropriately. Screen captures can be performed on at least part of the content and then rendered onto another surface.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
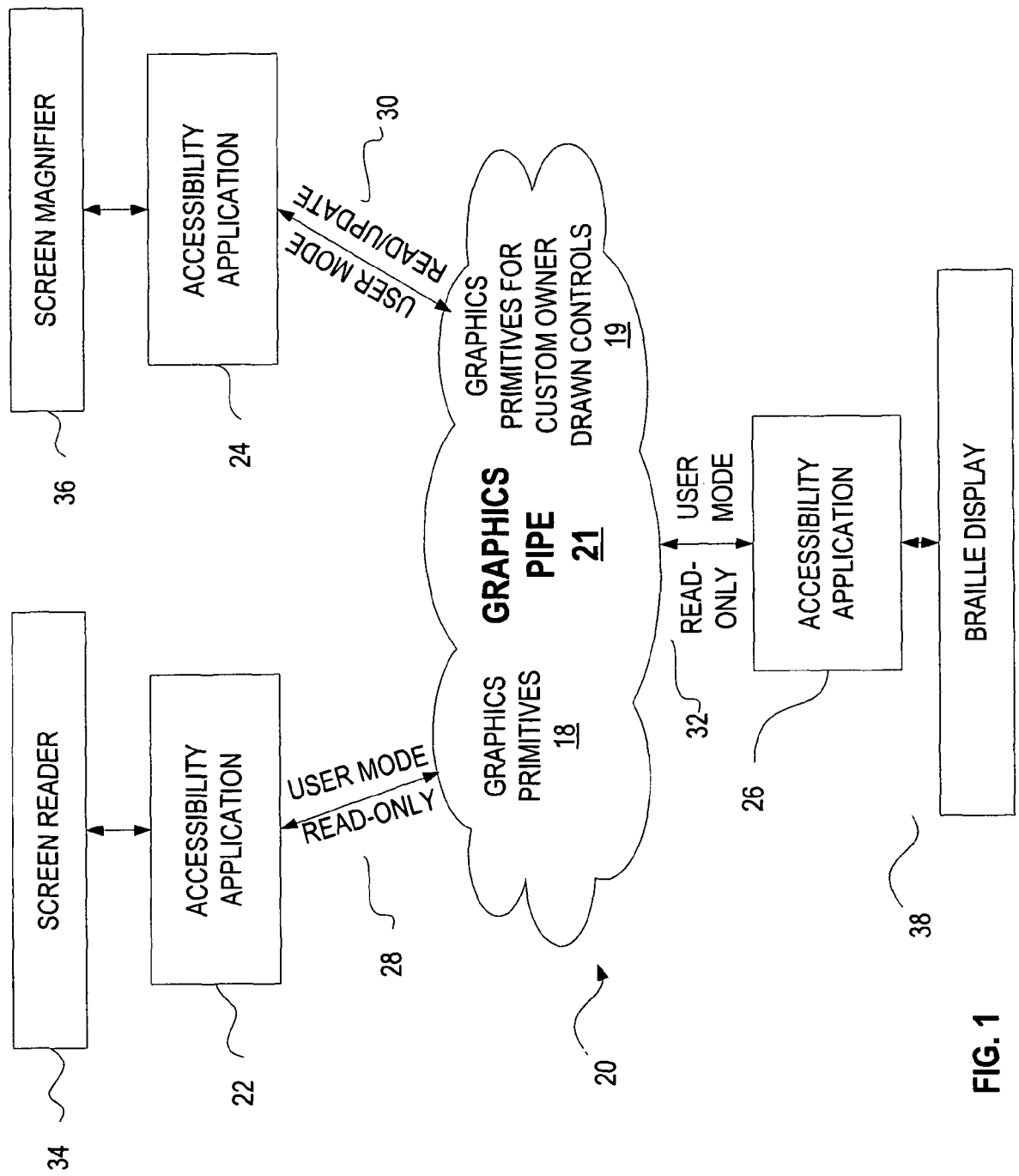
FIG. 1 is a diagrammatic view of parts of a graphics pipe system.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that improves the operation of accessibility applications and their related assistive technologies, such as screen readers, screen magnifiers, and Braille displays. One or more of the techniques described herein can be implemented as features within a graphics pipe application, or from any other type of program or service that facilitates accessibility scenarios. As described in further detail herein, in one implementation of the system, a graphics pipe is provided that can be called in user mode from multiple accessibility programs simultaneously. In another implementation, the accessibility application listens to the graphics pipe for particular content of interest and builds a model based on that content. The model is used to deliver content in an accessibility application to an end user appropriately.

As shown in FIG. 1, graphics pipe system 20 includes graphics pipe 21 and accessibility applications (22, 24, and 26, respectively). Graphics pipe 21 allows accessibility applications 22, 24, and/or 26 to intercept graphics primitives (e.g. geometry calls, text calls) 18, and/or information related to custom owner drawn controls 19. Graphics pipe 21 serves as a central location for accessibility applications to retrieve graphic display information that can be modeled and used in rendering content (and modifying content, if appropriate) in accessibility scenarios. In one implementation, connections through graphics pipe 21 are in user mode, instead of kernel mode, thereby providing a more reliable operating environment.

In one implementation, accessibility application 22 is coupled to graphics pipe 21 in read-only user mode over communication pathway 28, and serves as screen reader 34. Accessibility application 24 is coupled to graphics pipe 21 in read and/or update user mode over communication pathway 30, and serves as a screen magnifier 36. Similarly, accessibility application 26 is coupled to graphics pipe 21 in read-only user mode over communication pathway 32, and serves as a Braille display. In one implementation, screen readers and Braille displays do not need to alter the content of graphics pipe 21, so their respective connections to graphics pipe 21 are read-only. Numerous other accessibility applications and assistive technologies could be used instead of or in addition to those shown in FIG. 1.

Figure 2:
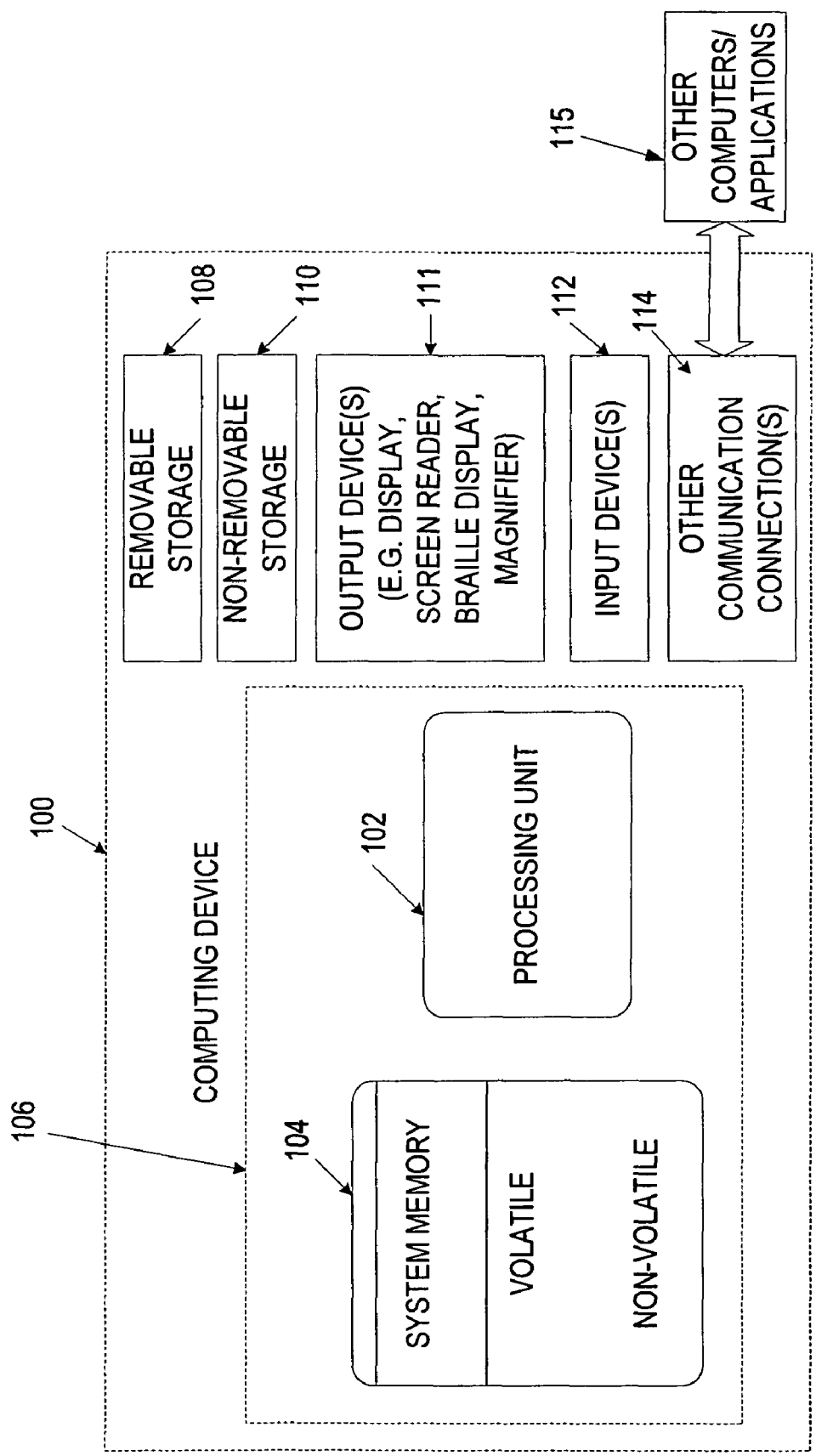
FIG. 2 is a diagrammatic view of a computer system of one implementation of the system of FIG. 1.

As shown in FIG. 2, an exemplary computer system to use for implementing one or more parts of the system 20 includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 2 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 2 by removable storage 108 and non-removable storage 110. Computer storage media includes volatile and nonvolatile, removable and non-removable media implemented in any method or technology for storage of information such as computer readable instructions, data structures, program modules or other data.

Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 contains one or more communications interface (s) 114 that allow the device to communicate with other devices. For example, communications interface (s) 114 allows computing device 100 to communicate with one or more other computers and/or applications 115, where applicable. Examples of communications interfaces are serial ports, Universal Serial Bus (USB) ports, parallel ports, wireless communication adapters, network adapters, etc. Communications interface(s) 114 are used by computer 100 to exchange information such as communication media with external devices. Some examples of communication media are computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 112 such as keyboard, mouse, pen, voice input device, touch input device, etc. Output device(s) 111 such as a display, screen reader, Braille display, magnifier, speakers, printer, etc. may also be included. These devices are well known in the art and need not be discussed at length here.

Figure 3:
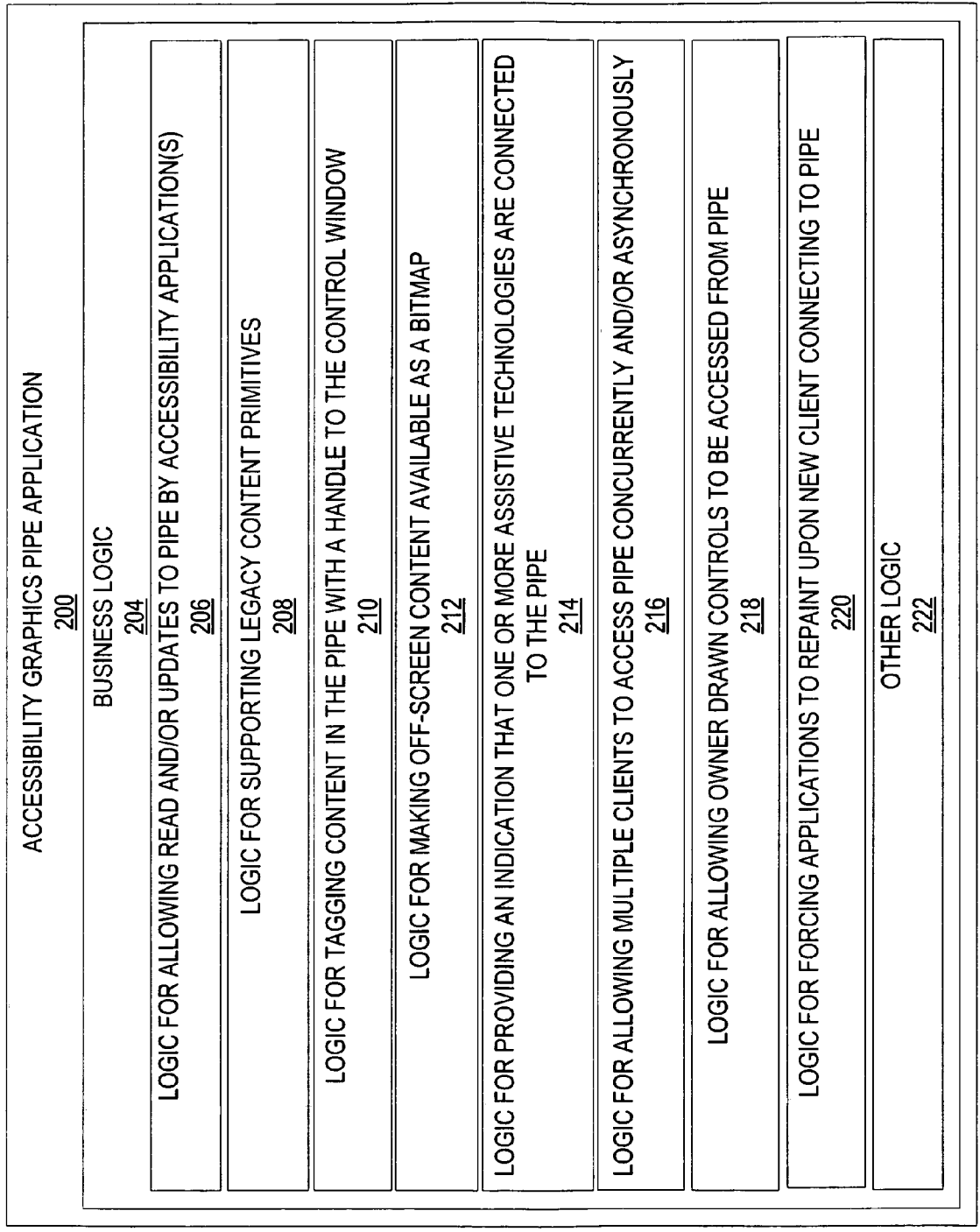
FIG. 3 is a diagrammatic view of an accessibility graphics pipe application operating on the computer system of FIG. 2.

Turning now to FIG. 3 with continued reference to FIG. 2, an accessibility graphics pipe application 200 operating on computing device 100 is illustrated. In one implementation, accessibility graphics pipe application 200 is included as part of the resident operating system on system memory 104, such as MICROSOFT® WINDOWS® or Linux. In another embodiment, accessibility graphics pipe application 200 is one of the application programs that reside on computing device 100. Alternatively or additionally, one or more parts of accessibility graphics pipe application can be part computers and/or applications 115, or other such variations as would occur to one in the computer software art.

Accessibility graphics pipe application 200 includes business logic 204, which is responsible for carrying out some or all of the techniques described herein. Business logic may include logic 206 for allowing read and/or updates to the graphics pipe by accessibility applications, logic 208 for supporting legacy content primitives, logic 210 for tagging content in the pipe with a handle to the control window, logic 212 for making off-screen content available as a bitmap, logic 214 for providing an indication that one or more assistive technologies are connected to the graphics pipe, logic 216 for allowing multiple clients to access the pipe concurrently and/or asynchronously, logic 218 for allowing owner drawn controls to be accessed through the graphics pipe, logic 220 for forcing applications to repaint upon new client connection to the graphics pipe, and other logic 222 for operating accessibility graphics pipe application 200.

In one implementation, accessibility graphics pipe application 200 resides on computing device 100. It will be understood that business logic 204 of graphics pipe application 200 can alternatively or additionally be embodied as computer-executable instructions on one or more computers and/or in different variations than shown on FIGS. 2 and 3. As one non-limiting example, one or more parts of business logic 204 could alternatively or additionally be implemented as a service that resides on an external computer that is called when needed.

Figure 4:
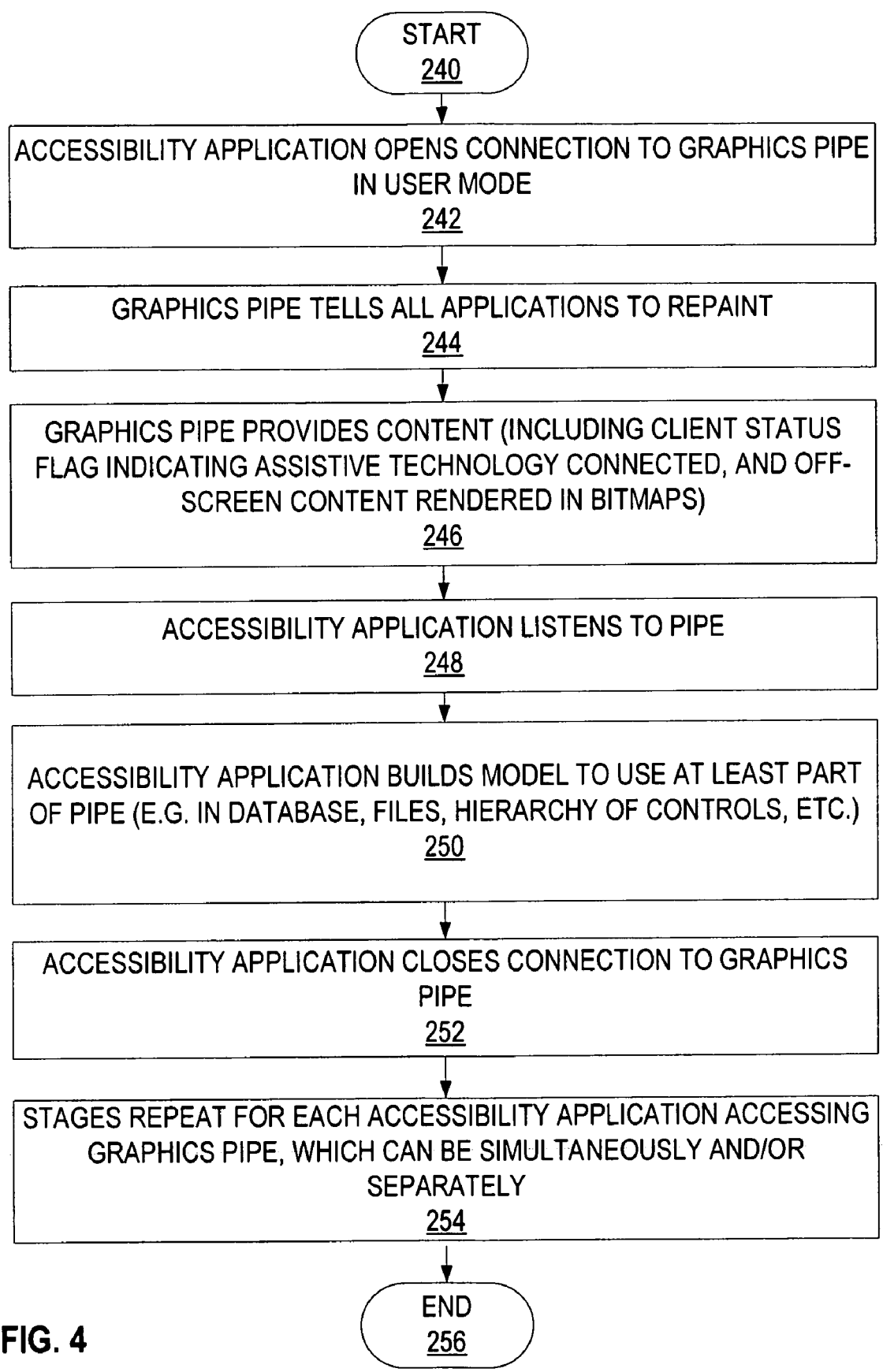
FIG. 4 is a high-level process flow diagram for one implementation of the system of FIGS. 1 and 2.

Turning now to FIGS. 4-7 with continued reference to FIGS. 1-3, the stages for implementing one or more implementations of accessibility graphics pipe application 200 are described in further detail. It will be appreciated that some, all, or fewer of these stages can be performed, and that they can be performed in a variety of different orders than as described in FIGS. 4-7. FIG. 4 is a high level process flow diagram of one implementation of accessibility graphics pipe 200. In one form, the process of FIG. 4 is at least partially implemented in the operating logic of computing device 100 and is executed as part of business logic 204.

The process begins at start point 240 with accessibility application opening a connection to graphics pipe in user mode (stage 242). In one implementation, when the accessibility application connects, the graphics pipe tells all applications to repaint (stage 244) so they will have the most current content. The graphics pipe provides content (stage 246), and the accessibility application listens to the pipe for that content (stage 248). The content can include a client status flag indicating whether or not assistive technology is connected (stage 246), and/or the content can include off-screen content rendered in bitmaps (stage 246). The accessibility application builds a model to use at least part of the pipe (stage 250). The accessibility application closes the connection to the graphics pipe when finished (stage 252). The stages are repeated for each accessibility application (one or more of 22, 24, and/or 26) that accesses the graphics pipe, which can be simultaneously and/or separately (stage 254). The process then ends at end point 256.

Figure 5:
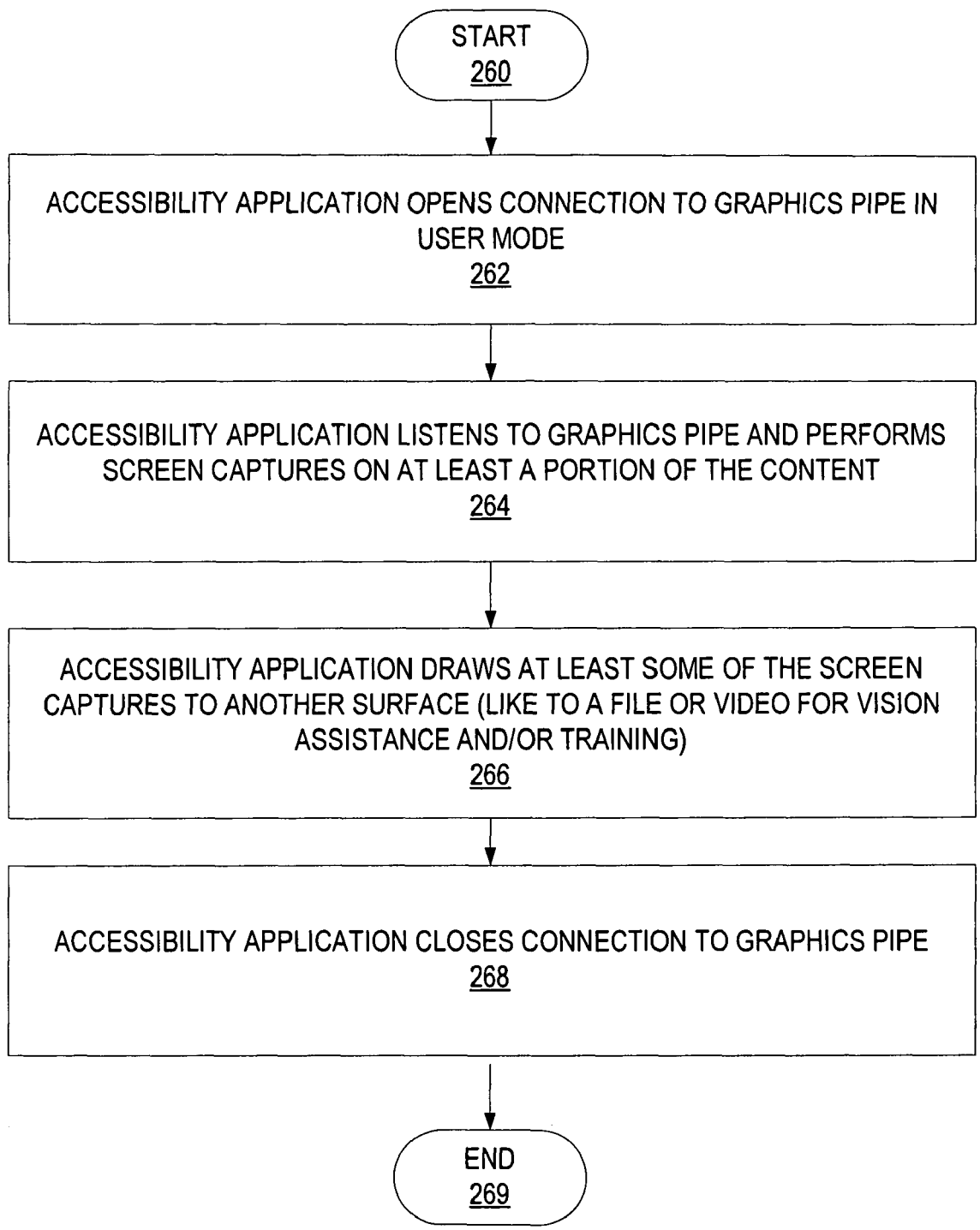
FIG. 5 is a process flow diagram for one implementation of the system of FIGS. 1 and 2 illustrating the stages involved in performing screen captures on the graphics pipe and drawing the screen captures to another surface.

Turning now to FIG. 5, a process flow diagram for one implementation of the system of FIG. 1 illustrates the stages involved in performing screen captures on the graphics pipe and drawing the screen captures to another surface. In one form, the process of FIG. 5 is at least partially implemented in the operating logic of computing device 100. The process begins at start point 260 with accessibility application opening a connection to the graphics pipe in user mode (stage 262). Accessibility application listens to the graphics pipe and performs screen captures on at least a portion of the content (stage 264). Accessibility application then draws at least some of the screen captures to another surface, such as to a file or video for vision assistance and/or training (stage 266). The accessibility application then closes the connection to the graphics pipe (stage 268). The process then ends at end point 269.

Figure 6:
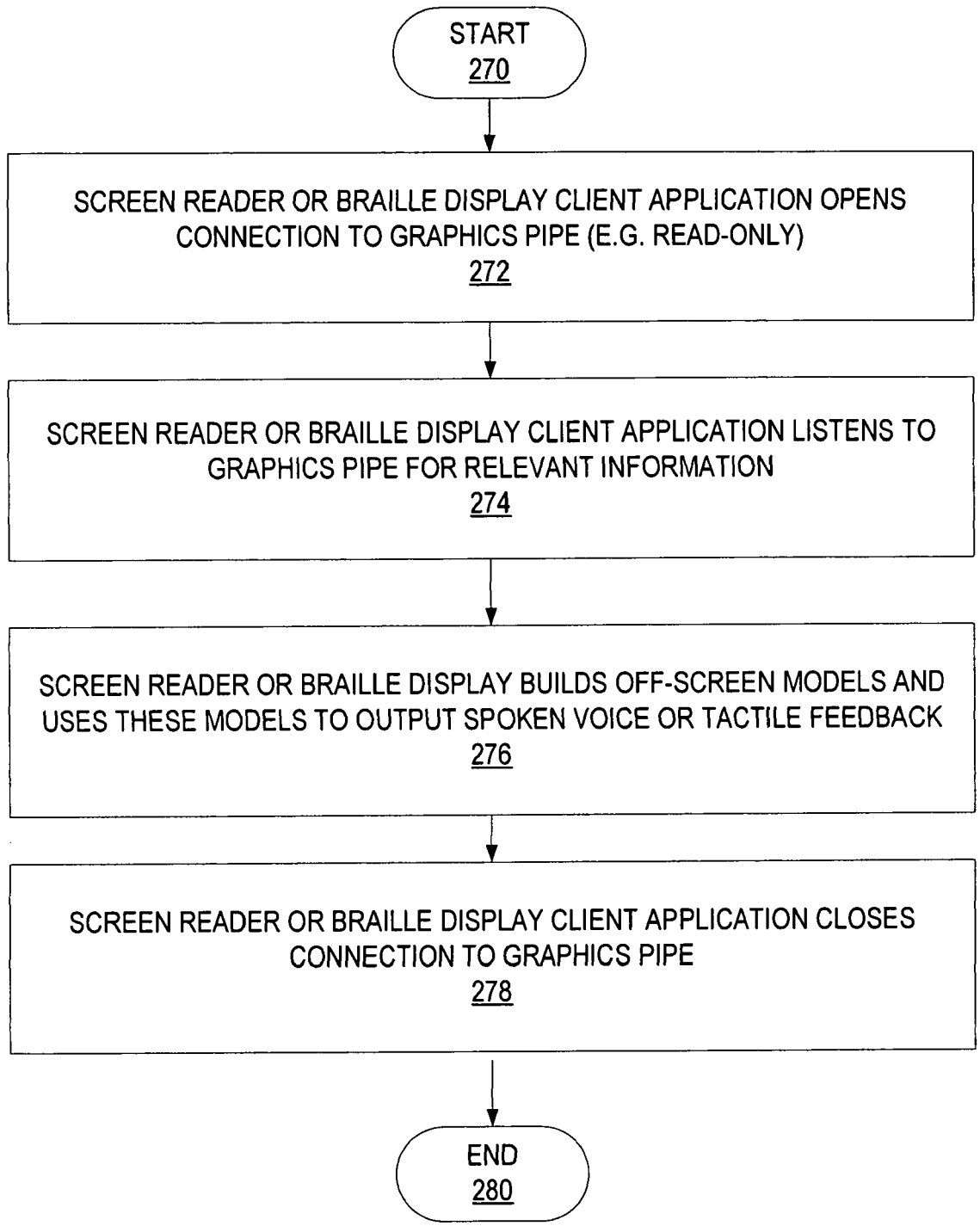
FIG. 6 is a process flow diagram for one implementation of the system of FIGS. 1 and 2 illustrating the stages involved in screen readers or Braille displays accessing the graphics pipe and building a content model.

Turning now to FIG. 6, a process flow diagram for one implementation of the system of FIG. 1 illustrates the stages involved in screen readers or Braille displays accessing the graphics pipe and building a content model. In one form, the process of FIG. 6 is at least partially implemented in the operating logic of computing device 100. The process begins at start point 270 with a screen reader or Braille display client application opening a connection to the graphics pipe, such as in a read-only fashion (stage 272). The screen reader or Braille display client application listens to the graphics pipe for relevant information (stage 274). The screen reader or Braille display builds off-screen models and uses these models to output spoken voice or tactile feedback (stage 276). The screen reader or Braille display client application closes the connection to the graphics pipe (stage 278). The process then ends at end point 280.

Figure 7:
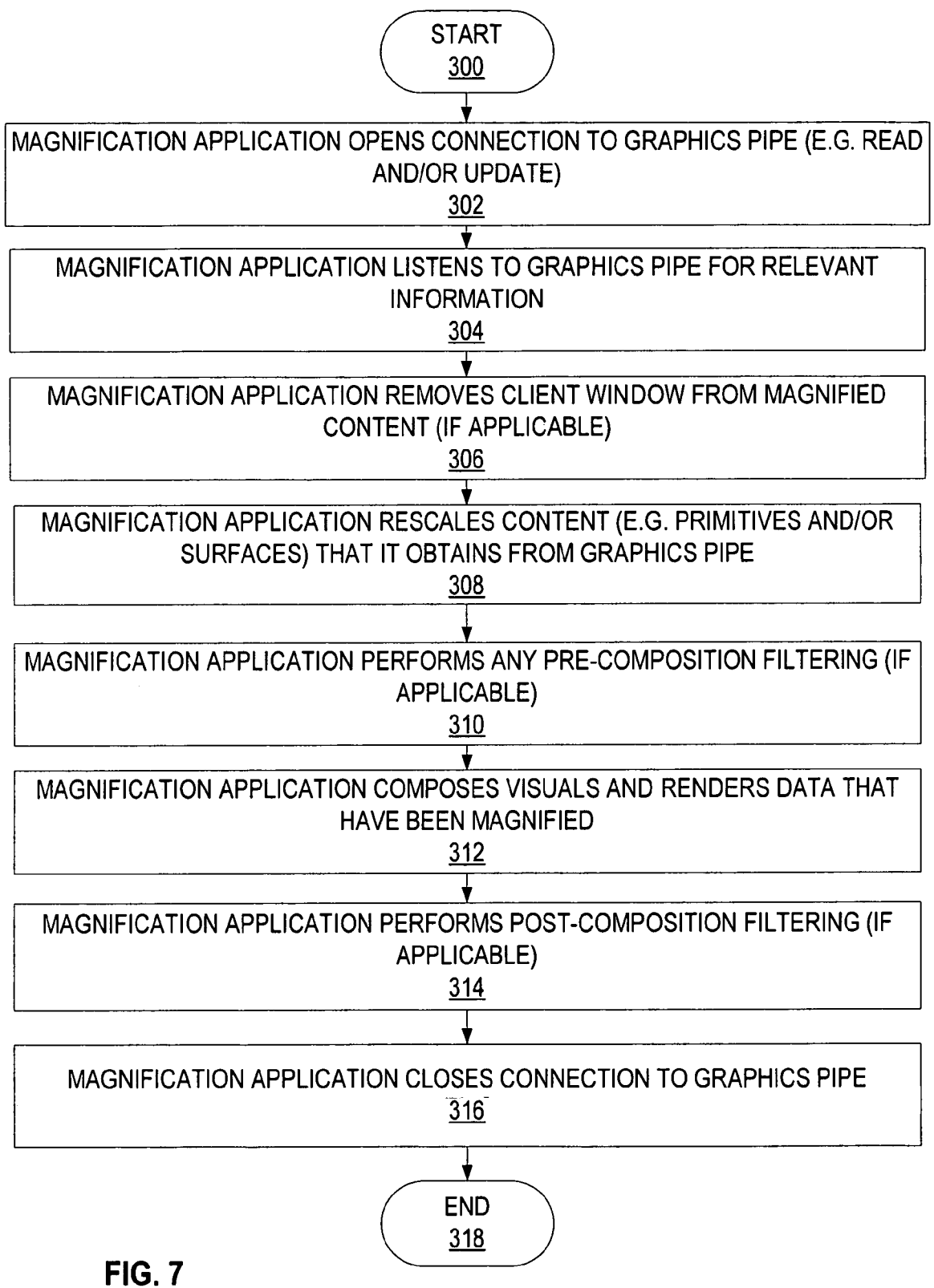
FIG. 7 is a process flow diagram for one implementation of the system of FIGS. 1 and 2 illustrating the stages involved in magnifiers accessing the graphics pipe and building a content model.

Turning now to FIG. 7, a process flow diagram for one implementation of the system of FIG. 1 illustrates the stages involved in magnifiers accessing the graphics pipe and building a content model. In one form, the process of FIG. 7 is at least partially implemented in the operating logic of computing device 100. The process begins at start point 300 with the magnification application opening a connection to the graphics pipe such as in read-only and/or update mode (stage 302). The magnification application listens to the graphics pipe for relevant information (stage 304). The magnification application removes the client window from magnified content, if applicable (stage 306).

Alternatively or additionally, magnification application rescales content that it obtains from the graphics pipe, such as primitives and/or surfaces (stage 308). Any pre-composed filtering is also performed if applicable (stage 310). Magnification application composes visuals and renders the data that have been magnified (stage 312). Post-composition filtering is performed by magnification application, if applicable (stage 314). When finished, magnification application closes the connection to the graphics pipe (stage 316). The process then ends at end point 318.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer-readable storage medium having computer-executable instructions for causing a computer to perform steps comprising:

providing graphic display information relevant to a plurality of accessibility client applications designed to assist a user with one or more disabilities at a graphics pipe that is implemented by an accessibility graphics pipe application on a computer of the user, the graphics pipe operable to be called by each of the plurality of accessibility client applications on the computer of the user in user mode, the graphics pipe comprising a central location on the computer of the user for the plurality of accessibility client applications on the computer of the user to retrieve graphic display information that can be used in rendering content in accessibility scenarios;

receiving a request from a first accessibility client application running on the computer of the user to access the graphics pipe;

establishing a first connection on the computer of the user between the graphics pipe and the first accessibility client application for allowing the first accessibility client application to listen to the graphic display information relevant to the plurality of accessibility client applications provided at the graphics pipe for graphics primitives calls relevant to the first accessibility client application;

allowing the first accessibility client application to intercept graphics primitives calls relevant to the first accessibility client application from the graphics pipe over the first connection; and rendering content in an accessibility scenario with the first accessibility client application on a display of the computer of the user using information from the graphics primitives calls intercepted by the first accessibility client application from the graphics pipe.

2. The computer-readable storage medium of claim 1, further comprising the steps of:

receiving a request from a second accessibility client application to access the graphics pipe during at least a portion of a same time period as the first accessibility client application;

establishing a second connection between the graphics pipe and the second accessibility client application; and allowing the second accessibility client application to listen to the graphic display information relevant to the plurality of accessibility client applications provided at the graphics pipe and to intercept graphics primitives calls relevant to the second accessibility client application from the graphics pipe over the second connection.

3. The computer-readable storage medium of claim 1, wherein the graphics pipe communicates with one or more other client applications running on the computer of the user and tells each other running client application to repaint after the first connection is established with the first accessibility client application.

4. The computer-readable storage medium of claim 1, wherein the first connection to the graphics pipe is in a read-only mode.

5. The computer-readable storage medium of claim 1, wherein the graphics pipe is operable to be called asynchronously.

6. The computer-readable storage medium of claim 1, wherein the first accessibility client application is operable as at least one of a screen reader, a Braille display, and a magnifier.

7. The computer-readable storage medium of claim 1, wherein the graphic display information provided at the graphics pipe includes a client status flag to indicate whether an assistive technology is connected to the graphics pipe at a particular moment.

8. The computer-readable storage medium of claim 1, wherein the graphic display information provided at the graphics pipe includes off-screen content in a bitmap format.

9. A computer-readable storage medium having computer-executable instructions for causing a computer to perform steps comprising:

providing graphic display information relevant to a plurality of accessibility client applications designed to assist a user with one or more disabilities at a graphics pipe that is implemented by an accessibility graphics pipe application on the computer of the user, the graphics pipe operable to be called by each of the plurality of accessibility client applications on the computer of the user in user mode, the graphics pipe comprising a central location on the computer of the user for the plurality of accessibility client applications on the computer of the user to retrieve graphic display information that can be used in rendering content in accessibility scenarios;

from an accessibility client application, opening a connection to the graphics pipe;

from the accessibility client application, listening to the graphic display information relevant to the plurality of accessibility client applications provided by the graphics pipe for off-screen content relevant to the accessibility client application;

performing a set of screen captures on at least a portion of the off-screen content relevant to the accessibility client application;

in an accessibility scenario, drawing at least some of the screen captures to another surface with the accessibility client application; and closing the connection between the accessibility client application and the graphics pipe.

10. The computer-readable storage medium of claim 9, wherein the screen captures are drawn to another surface for vision assistance.

11. The computer-readable storage medium of claim 9, wherein the screen captures are written to a file.

12. The computer-readable storage medium of claim 11, wherein the screen captures are written to a file for use in a training video.

13. The computer-readable storage medium of claim 9, wherein the connection to the graphics pipe is in a read-only mode.

14. A method for using an accessibility graphics pipe comprising the steps of:

providing graphic display information relevant to a plurality of accessibility client applications designed to assist a user with one or more disabilities at a graphics pipe that is implemented by an accessibility graphics pipe application on a computer of the user, the graphics pipe operable to be called by each of the plurality of accessibility client applications on the computer of the user in user mode, the graphics pipe comprising a central location on the computer of the user for the plurality of accessibility client applications on the computer of the user to retrieve graphic display information that can used in rendering content in accessibility scenarios;

from an accessibility client application, opening a connection to the graphics pipe;

from the accessibility client application, listening to the graphic display information relevant to the plurality of accessibility client applications provided by the graphics pipe for graphics primitives calls relevant to the accessibility client application; and in an accessibility scenario, building an off-screen model with the accessibility client application using information from the graphics primitives calls intercepted by the accessibility client application from the graphics pipe.

15. The method of claim 14, wherein the off-screen model is used to output a spoken voice.

16. The method of claim 14, wherein the off-screen model is used to output tactile feedback.

17. The method of claim 14, wherein the accessibility application is a screen reader.

18. The method of claim 14, wherein the accessibility application is a Braille provider.

19. The method of claim 14, wherein the accessibility application is a magnifier.

20. A computer-readable storage medium having computer-executable instructions causing a computer to perform the steps recited in claim 14.

\* \* \* \* \*